United States Patent [19]
Spaeth et al.

[11] Patent Number: 4,780,074
[45] Date of Patent: Oct. 25, 1988

[54] APPARATUS AND METHOD FOR REMOVING FLASH FROM MOLDED PLASTIC PRODUCTS

[75] Inventors: William E. Spaeth, Mechanicsburg; William H. Whitehaus, Hummelstown; William T. Glenwright, York; Gottlieb O. Oyster, Hummelstown, all of Pa.

[73] Assignee: AMP Incorporated, Harrisburg, Pa.

[21] Appl. No.: 55,576

[22] Filed: May 28, 1987

[51] Int. Cl.$^4$ ............................................. B29C 67/00
[52] U.S. Cl. .................................. 425/445; 118/315; 118/324
[58] Field of Search ............... 118/315, 313, 316, 314, 118/324, 323; 425/445

[56] References Cited

U.S. PATENT DOCUMENTS

| | | | |
|---|---|---|---|
| 2,967,326 | 1/1961 | Collins | 29/546 |
| 3,280,795 | 10/1966 | Zipperlin | 118/313 |
| 3,543,619 | 12/1970 | Down et al. | 83/24 |
| 3,720,021 | 3/1973 | Wada | 51/281 |
| 4,092,953 | 6/1978 | Waugh | 118/315 |
| 4,458,626 | 7/1984 | Dessilani | 118/315 |

FOREIGN PATENT DOCUMENTS 648560 8/1937 Fed. Rep. of Germany.

Primary Examiner—Willard Hoag
Attorney, Agent, or Firm—Allan B. Osborne

[57] ABSTRACT

An apparatus for removing flash from molded plastic products. More particularly, the apparatus includes a hydro-deflasher unit which directs high pressure streams of water thru several individual adjustable nozzles located above a track on which the products move.

5 Claims, 4 Drawing Sheets

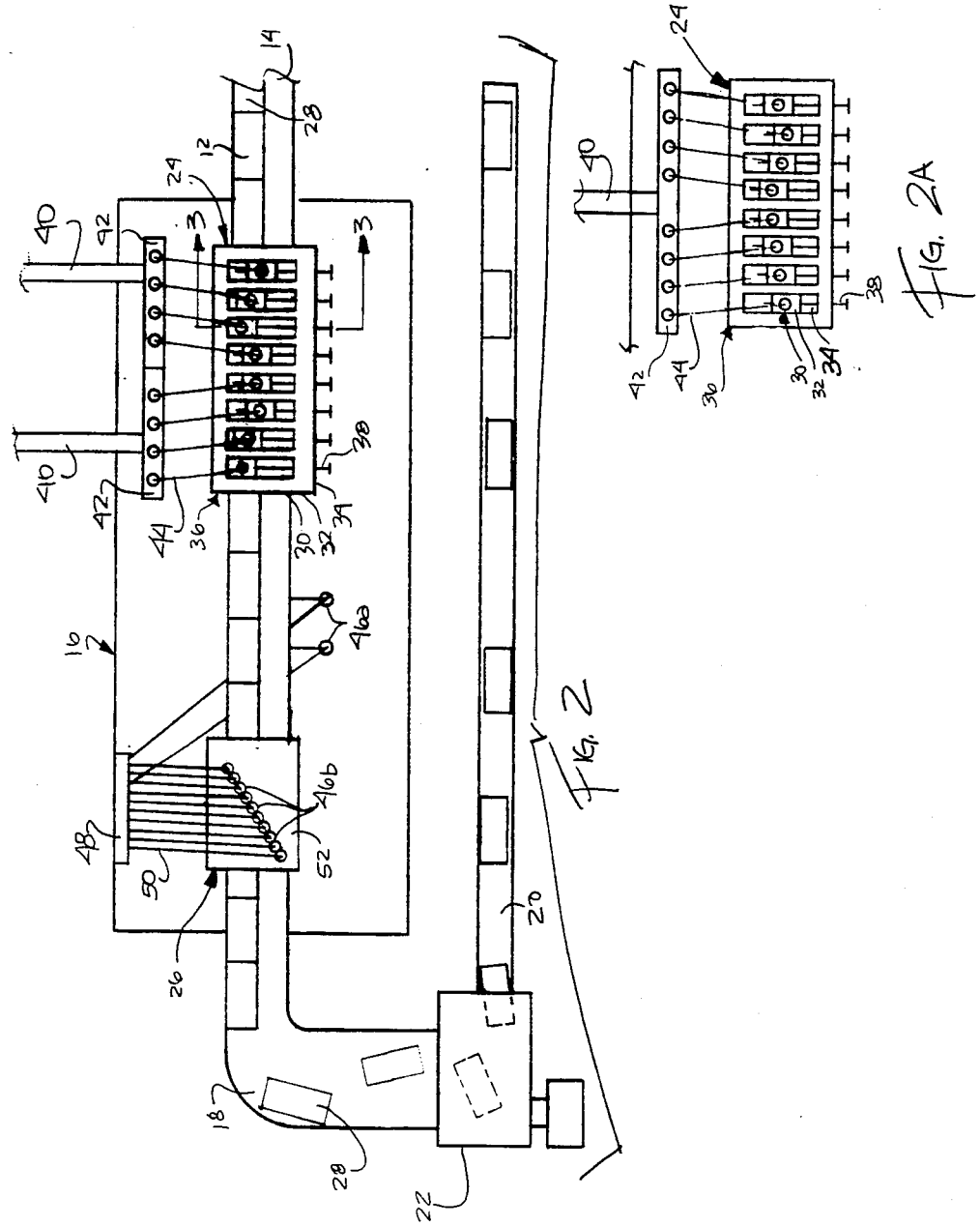

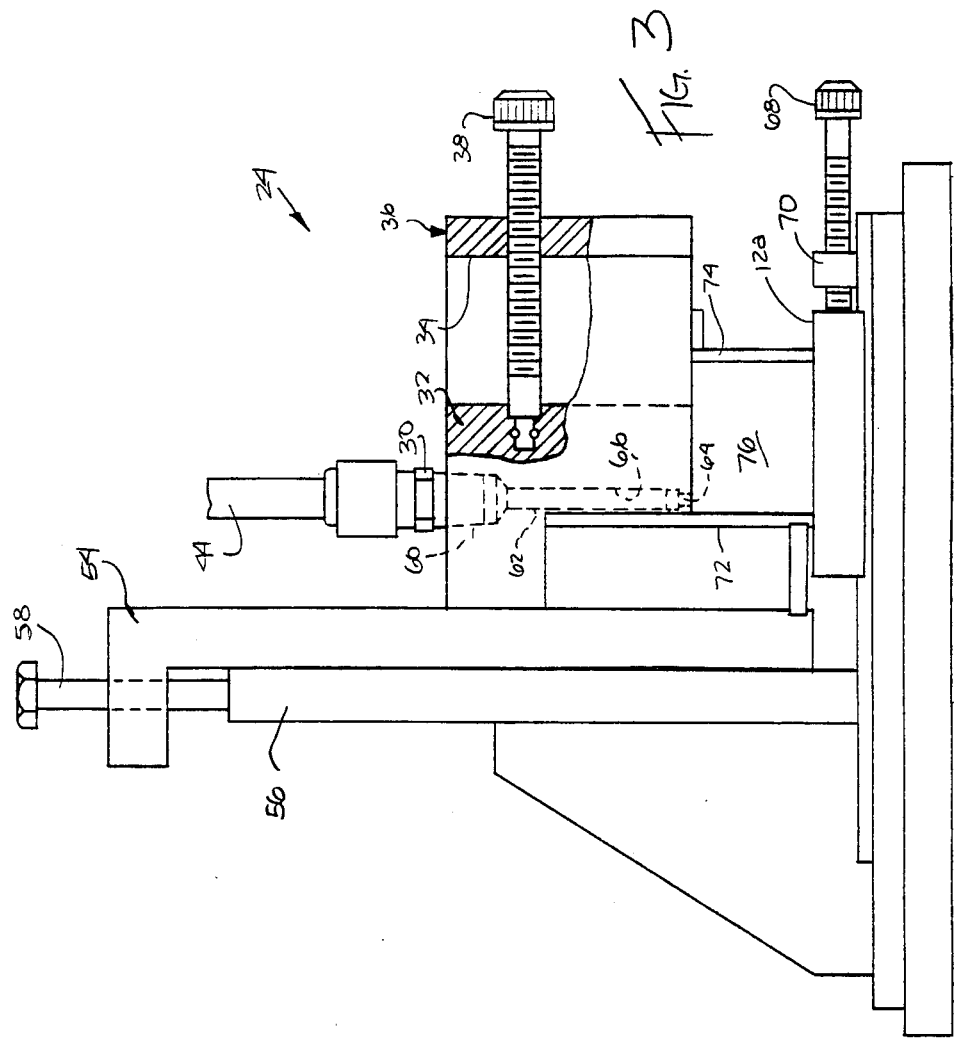

APPARATUS AND METHOD FOR REMOVING FLASH FROM MOLDED PLASTIC PRODUCTS

FIELD OF THE INVENTION

The invention disclosed herein relates to an apparatus and method for removing flash from molded plastic products.

BACKGROUND OF THE INVENTION

It is known from U.S. Pat. Nos. 2,967,326 and 3,543,619 to use hot air to remove flash from molded plastic products. Although the use of hot air is effective, the teachings of both prior art patents include accessory apparatus to prevent the product from being distorted, deformed or otherwise adversely affected by the hot air during the deflashing operation.

It is also known from the prior art to use particulate material directed forcefully against molded plastic products to remove flash. While the use of such material is also effective, it has been found that some of the material remains in the treated product, even after being air cleaned, which interferes with the use thereof.

It is now proposed to use water directed forcefully against molded plastic products to remove flash therefrom to avoid the problems noted above.

SUMMARY OF THE INVENTION

According to the invention, an apparatus incorporating a hydro-deflasher unit for removing flash from molded plastic products includes a plurality of individually adjustable nozzles for delivering high pressure streams of water. Each nozzle is positioned in separate blocks movably mounted in a support member movably positioned above a track on which the plastic products move. Ancillary equipment includes a water removal unit for driving water off the products subsequent to being deflashed and a drying unit for providing totally dry products.

BRIEF DESCRIPTION OF THE DRAWINGS

FIGS. 2 and 2a are top plan views of the work table of FIG. 1 showing in some detail the layout thereof;

FIG. 3 is a partly sectioned side elevation view, taken along line 3—3 of FIG. 2, showing the hydro-deflashing unit of the present invention;

DESCRIPTION OF THE INVENTION

Figure 1:
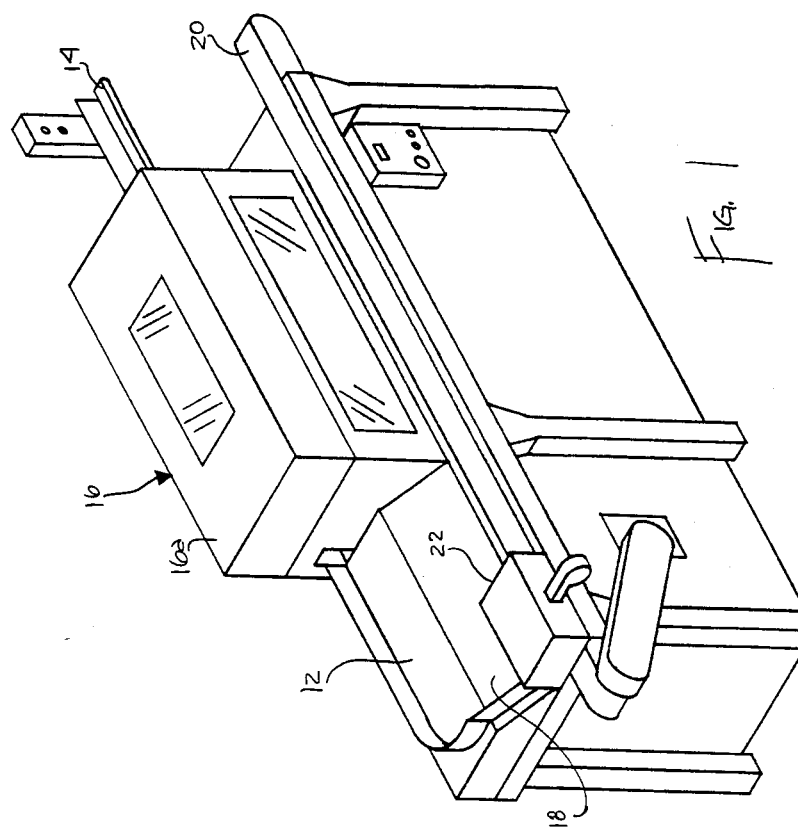
FIG. 1 is a generalized view of a work table incorporating the apparatus of the present invention.

Work table 10 shown in FIG. 1 includes track 12 which, from point 14, extends thru station 16, down ramp 18 and connects with conveyor 20 inside drying unit 22. Station 16 includes hydro-deflashing unit 24 and water removal unit 26, both of which are shown in FIG. 2. A removable cover 16a is provided for station 16.

Pumps and other equipment which are associated with the operation of the apparatus and method of the present invention will be discussed but are not shown as such are well known to those having ordinary skill in the art.

As shown in FIG. 2, molded plastic products 28 are placed end to end on track 12 at point 14 and pushed thru station 16, shown with cover 16a removed, to ramp 18 where they slide down into drying station 22 and onto conveyor 20. During transit thru station 16, flash is removed by high pressure streams of water from hydro-deflasher unit 24 located above track 12. This unit includes one or more water nozzles 30 which are positioned in separate blocks 32 mounted in slots 34 in support member 36. Blocks 32 may be moved back and forth across track 12 by means of screws 38 so that nozzles 30 may be accurately positioned over products 28 or a specific area thereon.

In the embodiment shown, water pressurized by dual conventional pumps (not shown), flows thru hoses 40 to manifold 42 and from there to nozzles 30 thru individual flexible, high pressure tubing 44. Most of the water quickly drains off products 28 and out through openings (not shown) in track 12. Any water droplets remaining on and in products 28 are blown away by air from water removal unit 26. Unit 26 includes several air nozzles 46 with one or more air nozzles 46a located alongside track 12 and one or more air nozzles 46b located over track 12. As shown, nozzles 46b cross over track 12 diagonally to provide overlapping air coverage of products 28 passing underneath. Pressurized air from a conventional air compressor (not shown) enters manifold 48 and goes to the separate nozzles 46 thru suitable tubing 50. Also included as part of unit 26 are supporting member 52 for nozzles 46b which if desired, may be movably mounted therein such as nozzles 30 are in unit 24. Nozzles 46a are rigidly mounted on table 10 at an appropriate height.

FIG. 2a shows another embodiment of unit 24 wherein nozzles 30 are supplied from a single manifold 42.

Drying unit 22 may use any conventional means for applying forced hot air to products 28 to insure their complete dryness prior to leaving table 10 via conveyor 20. For example, a hot air blower has been found to work satisfactorily.

FIG. 3 provides specific details relative to hydro-deflashing unit 24. As shown, support member 36 is secured to arm 54 which in turn is movably mounted to support plate 56. By rotating bolt 58, support member 36 may be moved towards and away from track 12 to accommodate the height of products 28 being deflashed.

FIG. 3 also shows in greater detail block 32 and screw 38 which is threadedly mounted in support member 36. The free end of screw 38 is pinned to block 32 so that the screw can be rotated freely while remaining secured thereto. Thus, block 32 and nozzle 30 therein can be positioned at any point between the edges of track 12 as required. Nozzle 30 includes threaded portion 60 which is threadedly received in block 32. An elongated stem 62 leading to outlet 64 of nozzle 30 is received in complementary shaped passage 66 in block 62 such that outlet 64 is positioned adjacent the base thereof.

The portion of track 12 underlying unit 24, indicated in FIG. 3 by reference numeral 12a, is made independent of track 12 on either side thereof and is movable in a direction normal to the length of table 10. Adjustment is by means of screw 68 threadly mounted in block 70.

Two elongated side walls, 72 and 74, are located within unit 24 to define a confined space 76 in cooperation with support member 36 and track portion 12a.

Wall 72, fixed to arm 54, has one end extending up into an opening in the rear of member 36 and another end positioned just above track portion 12a. The overlap allows a support member 36 to be moved upwardly without creating a gap. Wall 74 is mounted on track portion 12a such that it moves in and out therewith but is also adjustable up and down independently of portion 12a to accommodate the vertical adjustment of member 36. A set screw (not shown) provides the means of fixing the vertical position of wall 74. The adjustability of track portion 12a, support member 36 and walls 72 and 74 permits accepting products 28 of various sizes.

Figure 4A:
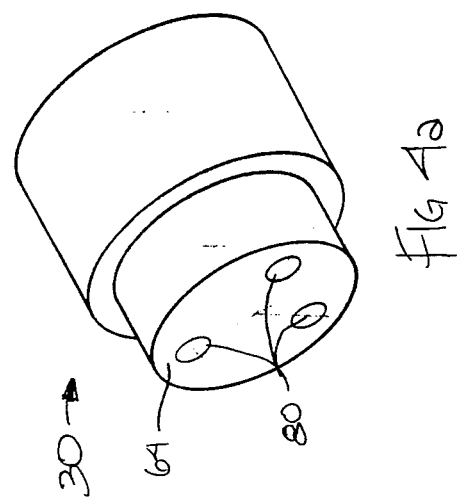
FIGS. 4A, 4B, and 4C are respectively, perspective, sectioned and bottom plan views of a nozzle component of the flash removing apparatus.
Figure 4B:
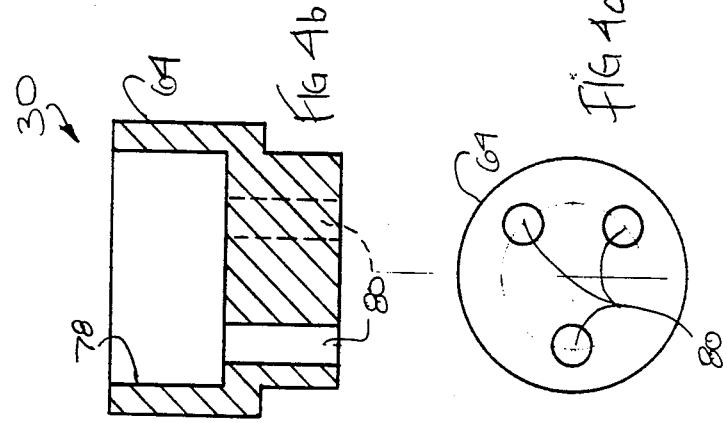
Figure 4C:
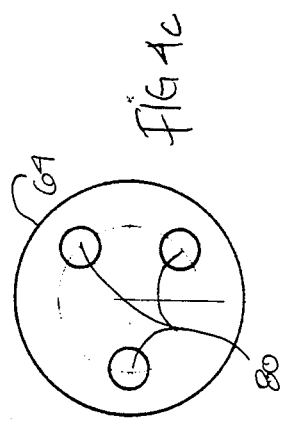

Outlet 64 of nozzle 30 is shown in FIGS. 4A, 4B, and 4C. Passage 78, extending thru nozzle 30, communicates with three holes 80 of reduced diameter extending through the free end of outlet 64. Holes 80 channel and concentrate the stream of pressurized water into three jets for more effective action in removing flash.

Figure 5:
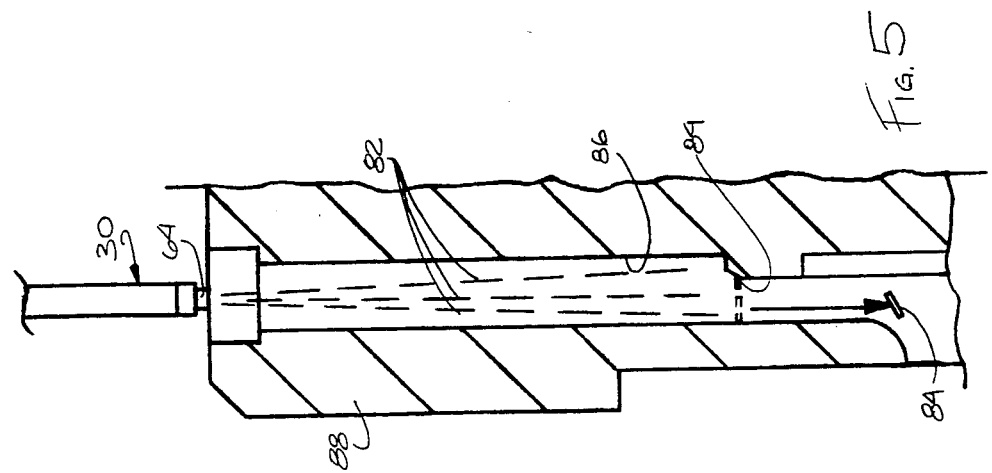
FIG. 5 is a sectioned view illustrating a step in removing flash from within a passage in a molded plastic product.

FIG. 5 illustrates jets of water 82 from a nozzle 30 striking and removing flash 84 from within passage 86 of a molded plastic housing 88.

Water pressure required for removing flash from products such as a plastic housing of Eurocard printed circuit board connector is about 2500 psi. Other products may require more or less pressure.

Air pressure for use with unit 26 need only be about 40–80 psi; i.e., a pressure sufficient to drive off any remaining water droplets.

The temperature of hot air used at drying unit 22 may be about 140 degrees fahrenheit.

The use of water for removing flash has a distinct advantage over using particulate material in that erosion is minimized and contamination of passages in a product is completely eliminated.

As can be discerned, our apparatus and method for removing flash from molded plastic products has been disclosed. The apparatus includes a hydro-deflasher unit which directs streams of pressurized water against the products containing flash to be removed. Further, the apparatus includes a water removal unit which uses compressed air to drive off any water remaining on the products. A drying unit may also be used to insure total dryness if required. The hydro-deflasher unit includes a plurality of individuall adjustable nozzles so that the streams of water adequately cover the products moving therethru. Further, the support member in which the nozzles are positioned may be moved towards and away from the track on which the products move to accommodate various shapes and sizes of articles as well as to optimize the water action.

We claim:

1. An apparatus for removing flash from molded plastic products, said apparatus comprising:
   track means for conveying molded plastic products;
   source means for supplying water at a given pressure;
   support means mounted above said track means for supporting a plurality of nozzles;
   first adjusting means for moving said support means toward and away from said track means;
   a plurality of nozzles mounted side by side in said support means with said plurality of nozzles being parallel to said track means, said nozzles being connected to said source means and adapted to direct water against the plastic products to remove flash therefrom; and
   a plurality of second adjusting means mounted in said support means and each adapted to move but a single nozzle back and forth perpendicular to an axis of said track means independent of the other nozzles.

2. The apparatus of claim 1 wherein each nozzle is mounted in a separate block in said support means and said second adjusting means include a threaded member, threadedly mounted in a wall of said support means and rotatably attached to said block.

3. The apparatus of claim 2 wherein said nozzles include a passage which terminates in an outlet having a plurality of holes of reduced diameter relative to said passage so that water flowing therethrough is diverted into a plurality of small streams.

4. The apparatus of claim 1 wherein a portion of said track means located beneath said support means may be moved transverse to the path of said track means.

5. The apparatus of claim 4 further including air means for drying the products subsequently to being deflashed.

* * * * *